[11] 3,588,229

| [72] | Inventors | Walter W
Klaus Elle, bad Kreuznach, Germany |
| [21] | Appl. No. | 842,945 |
| [22] | Filed | July 18, 1969 |
| [45] | Patented | June 28, 1971 |
| [73] | Assignee | Jos Schneider & Co., Optische Werke Kreuznach
Kreuznach, Rhineland, Germany |
| [32] | Priority | July 19, 1968 |
| [33] | | Germany |
| [31] | | P 17 97 279.1 |

[54] PHOTOGRAPHIC OBJECTIVE WITH FOUR AIR-SPACED SINGLETS
4 Claims, 1 Drawing Fig.

[52] U.S. Cl. .................................................. 350/221
[51] Int. Cl. ........................................... G02b 9/36, G02b 9/56

.............................. 350/221

[56] References Cited
UNITED STATES PATENTS
2,390,387  12/1945  Rayton et al. ................ 350/221
2,818,776  1/1958  Hayes et al. .................. 350/221X

*Primary Examiner*—David Schonberg
*Assistant Examiner*—Paul A. Sacher
*Attorney*—Karl F. Ross ABSTRACT: Photographic objective, especially telephoto objective, with four air-spaced singlets forming a front group and a rear group, the front group consisting of a biconvex first lens and a biconcave second lens, the rear group consisting of a third lens in the form of a negative meniscus and a fourth lens in the form of a positive meniscus.

PATENTED JUN 28 1971 3,588,229
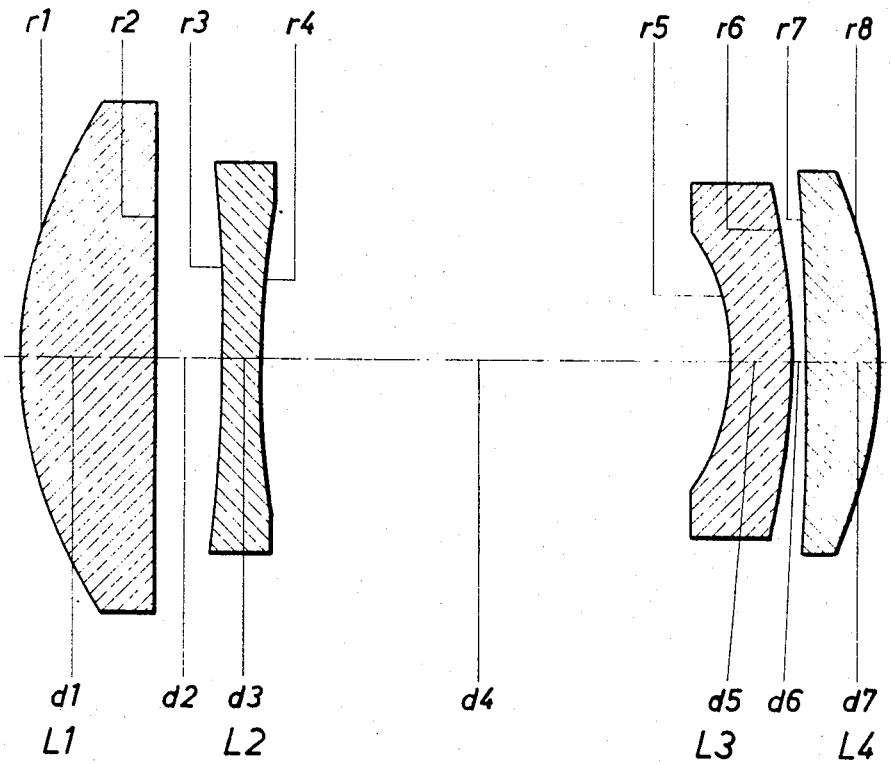
WALTER WÖLTCHE
KLAUS ELLE
*Inventors*
BY: *Karl J. Ross*
*Attorney*

PHOTOGRAPHIC OBJECTIVE WITH FOUR AIR-SPACED SINGLETS

Our present invention relates to a photographic (or cinematographic) objective of the type wherein four air-spaced singlets, i.e. a positive first lens, a negative second lens, a negative third lens and a positive fourth lens, define a front group and a rear group separated from each other by a diaphragm space which is large compared with the air spaces separating the two lenses of each group.

The general object of the present invention is to provide an objective of this character, especially a telephoto objective, adapted to be used with relative apertures on the order of 1:6.3 to 1:4.5 and with field angles up to about ±17° with good correction of both aperture-dependent and angle-dependent aberrations.

A more specific object of our invention is to provide an objective of this description in which the field curvature is minimized, with attainment of a Petzval radius in a range of 17 to 33 times the overall focal length.

In accordance with our present invention, the diaphragm space between the two lens groups exceeds by an order of magnitude the air space separating the lenses of the front group (specifically by being about 7 to 13 times as large as the latter air space) whereas the last-mentioned air space, in turn, exceeds by an order of magnitude the air space separating the lenses of the rear group (specifically by being about 25 to 33 times as large as the gap between the third and fourth lenses). Advantageously, pursuant to another feature of our invention, the first lens is a biconvex member with a nearly planar rear surface, the second lens is a biconcave member with a front surface less strongly curved than its rear surface, the third lens is a forwardly concave negative meniscus, and the fourth lens is a forwardly concave position meniscus whose front surface is more strongly curved than the confronting rear surface of the third lens.

The sole FIGURE of the accompanying drawing shows, diagrammatically, an objective according to our invention including a biconvex first lens L1 with radii $r1$, $r2$ and thickness $d1$, a biconcave second lens L2 with radii $r3$, $r4$ and thickness $d3$, a meniscus-shaped third lens L3 of dispersive character with radii $r5$, $r6$ and thickness $d6$, and a meniscus-shaped fourth lens L4 of collective character with radii $r7$, $r8$ and thickness $d7$.

The first air space $d2$, separating the lenses L1 and L2, is a small fraction of the diaphragm space $d4$ separating the two groups L1, L2 and L3, L4; the last air space $d6$, separating the lenses L3 and L4, is an even smaller fraction of air space $d2$.

We have found, in accordance with a more specific feature of our invention, that the desired flattening of image curvature can best be realized if the surface powers $\Delta n/r$ of the individual lens surfaces $r1$—$r8$ fall within the following ranges, with the respective surface radius $r$ given in terms of the overall focal length $f$ of the system assumed to have the value of unity:

| | |
|---|---|
| $r1$ | +2.4 to +3.1 |
| $r2$ | +0.1 to +0.3 |
| $r3$ | −0.6 to −0.8 |
| $r4$ | −1.0 to −1.7 |
| $r5$ | −3.9 to −4.2 |
| $r6$ | +0.9 to +1.4 |
| $r7$ | −0.3 to −0.6 |
| $r8$ | +2.4 to −2.8 |

By way of more specific example, we shall now give the parameters of four representative lens combinations whose surface powers fall within the ranges indicated above and which define objectives with an overall focal length $f=1$ (measured in arbitrary linear units).

TABLE I

| Lens | Radii | Thicknesses and Separations | Refractive Indices, $n_e$ | Abbe Numbers, $\nu_e$ | Surface Powers, $\Delta n/r$ |
|---|---|---|---|---|---|
| L1 | $r1=+0.20485$ | | | | +3.04056 |
| | | $d1=0.05013$ | 1.62286 | 60.06 | |
| | $r2=-2.27185$ | | | | +0.27416 |
| | | $d2=0.02005$ | Air space | | |
| | $r3=-0.95746$ | | | | −0.70775 |
| L2 | | $d3=0.01404$ | 1.67764 | 31.97 | 1.68638 |
| | $r4=+0.40183$ | | | | |
| | | $d4=0.24062$ | Diaphragm space | | |
| | $r5=-0.12450$ | | | | −4.16643 |
| L3 | | $d5=0.01003$ | 1.51872 | 63.96 | |
| | $r6=-0.37166$ | | | | +1.39568 |
| | | $d6=0.00060$ | Air space | | |
| | $r7=-1.92094$ | | | | −0.33654 |
| L4 | | $d7=0.03008$ | 1.64647 | 47.66 | |
| | $r8=-0.26705$ | | | | +2.42078 |

The foregoing objective has a relative aperture of 1:6.3 and is corrected for a field angle of ±15°; its back-focal length is 0.5104 linear units. With an actual focal length $f$ of 500 mm., it is suitable for an image size of 180 ×40 mm².

TABLE II

| Lens | Radii | Thicknesses and Separations | Refractive Indices, $n_e$ | Abbe Numbers, $\nu_e$ | Surface Powers, $\Delta n/r$ |
|---|---|---|---|---|---|
| L1 | $r1=+0.22507$ | | | | +2.76741 |
| | | $d1=0.05412$ | 1.62286 | 60.06 | |
| | $r2=-2.48554$ | | | | +0.25059 |
| | | $d2=0.02082$ | Air space | | |
| | $r3=-1.09580$ | | | | −0.63347 |
| L2 | | $d3=0.01665$ | 1.69416 | 30.95 | |
| | $r4=+0.49969$ | | | | −1.38918 |
| | | $d4=0.26229$ | Diaphragm space | | |
| | $r5=-0.13110$ | | | | −3.96888 |
| L3 | | $d5=0.01665$ | 1.52032 | 58.71 | |
| | $r6=-0.43749$ | | | | +1.18933 |
| | | $d6=0.00083$ | Air space | | |
| | $r7=-1.87764$ | | | | −0.35865 |
| L4 | | $d7=0.04163$ | 1.67341 | 46.82 | |
| | $r8=-0.28007$ | | | | +2.40444 |

The foregoing objective has a relative aperture of 1:5.6 and is corrected for a field angle of ±16.5°; its back-focal length is 0.4857 linear units. With an actual focal length $f$ of 240 mm., it is suitable for an image size of 90 ×120 mm².

TABLE III

| Lens | Radii | Thicknesses and Separations | Refractive Indices, n | Abbe Numbers, $\nu_e$ | Surface Powers, $\Delta n/r$ |
|---|---|---|---|---|---|
| L1 | r1= +0.24503 | d1=0.01747 | 1.62286 | 60.06 | +2.54197 |
|  | r2= −3.67569 |  |  |  | +0.16045 |
|  |  | d2=0.03335 | Air space |  |  |
| L2 | r3= −1.06912 | d3=0.01906 | 1.74703 | 27.88 | −0.69873 |
|  | r4= +0.66596 |  |  |  | −1.12173 |
|  |  | d4=0.27157 | Diaphragm space |  |  |
| L3 | r5= −0.12945 | d5=0.01906 | 1.52032 | 58.71 | −4.01947 |
|  | r6= −0.52675 |  |  |  | +0.98779 |
|  |  | d6=0.00143 | Air space |  |  |
| L4 | r7= −1.88906 | d7=0.04764 | 1.67341 | 46.82 | −0.35648 |
|  | r8= −0.25003 |  |  |  | +2.69332 |

The foregoing objective has a relative aperture of 1:4.8 and is corrected for a field angle of ±13°; its back-focal length is 0.4428 linear units. With an actual focal length $f$ of 210 mm., it is suitable for an image size of 60 ×90 mm².

We claim:

1. A photographic objective consisting of four air-spaced singlets including a positive first lens L1, a negative second lens L2, a negative third lens L3 and a positive fourth lens L4, said first and second lenses forming a front group, said third and fourth lenses forming a rear group, said front and rear groups being separated by an air space exceeding by an order of magnitude the air space separating said first and second lenses, the last-mentioned air space exceeding by an order of magnitude the air space separating said third and fourth lenses; the numerical values of the radii r1 to r8 of said lenses L1 to L4, their thicknesses and separations d1 to d7, their refractive indices $n_e$ and their Abbe numbers $\nu_e$ being substantially as given in the following table.

|  |  | $n_e$ | $\nu_e$ |
|---|---|---|---|
| r1= +0.23 | d1=0.05 | 1.62 | 60 |
| r2= −2.49 | d2=0.02 | Air space |  |
| r3= −1.10 | d3=0.02 | 1.69 | 31 |
| r4= +0.50 | d4=0.26 | Diaphragm space |  |
| r5= −0.13 | d5=0.02 | 1.52 | 59 |
| r6= −0.44 | d6=0.001 | Air space |  |
| r7= −1.88 | d7=0.04 | 1.67 | 47 |
| r8= −0.28 |  |  |  |

|  |  | $n_e$ | $\nu_e$ |
|---|---|---|---|
| r1= +0.20 | d1=0.05 | 1.62 | 60 |
| r2= −2.27 | d2=0.02 | Air space |  |
| r3= −0.96 | d3=0.01 | 1.68 | 32 |
| r4= +0.40 | d4=0.24 | Diaphragm space |  |
| r5= −0.12 | d5=0.01 | 1.52 | 64 |
| r6= −0.37 | d6=0.001 | Air space |  |
| r7= −1.92 | d7=0.03 | 1.65 | 48 |
| r8= −0.27 |  |  |  |

2. A photographic objective consisting of four air-spaced singlets including a positive first lens L1, a negative second lens L2, a negative third lens L3 and a positive fourth lens L4, said first and second lenses forming a front group, said third and fourth lenses forming a rear group, said front and rear groups being separated by an air space exceeding by an order of magnitude the air space separating said first and second lenses, the last-mentioned air space exceeding by an order of magnitude the air space separating said third and fourth lenses; the numerical values of the radii r1 to r8 of said lenses L1 to L4, their thicknesses and separations d1 to d7, their refractive indices $n_e$ and their Abbe numbers $\nu_e$ being substantially as given in the following table:

3. A photographic objective consisting of four air-spaced singlets including a positive first lens L1, a negative second lens L2, a negative third lens L3 and a positive fourth lens L4, said first and second lenses forming a front group, said third and fourth lenses forming a rear group, said front and rear groups being separated by an air space exceeding by an order of magnitude the air space separating said first and second lenses, the last-mentioned air space exceeding by an order of magnitude the air space separating said third and fourth lenses;

the numerical values of the radii r1 to r8 of said lenses L1 to L4, their thicknesses and separations d1 to d7, their refractive indices $n_e$ and their Abbé numbers $\nu_e$ substantially as given in the following table:

|  |  | $n_e$ | $\nu_e$ |
|---|---|---|---|
| r1= +0.25 | d1=0.02 | 1.62 | 60 |
| r2= −3.68 | d2=0.03 | Air space |  |
| r3= −1.07 | d3=0.02 | 1.75 | 28 |
| r4= +0.67 | d4=0.27 | Diaphragm space |  |
| r5= −0.13 | d5=0.02 | 1.52 | 59 |
| r6= −0.53 | d6=0.001 | Air space |  |
| r7= −1.89 | d7=0.05 | 1.67 | 47 |
| r8= −0.25 |  |  |  |

4. A photographic objective consisting of four air-spaced singlets including a positive first lens L1, a negative second lens L2, a negative third lens L3 and a positive fourth lens L4, said first and second lenses forming a front group, said third and fourth lenses forming a rear group, said front and rear groups being separated by an air space exceeding by an order of magnitude the air space separating said first and second lenses, the last-mentioned air space exceeding by an order of magnitude the air space separating said third and fourth lenses;

the numerical values of the radii $r1$ to $r8$ of said lenses L1 to L4, their thicknesses and separations $d1$ to $d7$, their refractive indices $n_e$ and their Abbé numbers $v_e$ being substantially as given in the following table:

|  |  | $n_e$ | $v_e$ |
|---|---|---|---|
| $r1=+0.26$ | $d1=0.08$ | 1.62 | 60 |
| $r2=-3.86$ | $d2=-0.04$ | Air space | |
| $r3=-1.02$ | $d3=0.02$ | 1.75 | 27 |
| $r4=+0.72$ | $d4=0.28$ | Diaphragm space | |
| $r5=-0.13$ | $d5=0.03$ | 1.52 | 52 |
| $r6=-0.45$ | $d6=0.001$ | Air space | |
| $r7=-1.34$ | $d7=0.05$ | 1.67 | 47 |
| $r8=-0.25$ | | | |